United States Patent
Hayasaki et al.

(10) Patent No.: US 8,750,001 B2
(45) Date of Patent: Jun. 10, 2014

(54) POWER SUPPLY DEVICE AND IMAGE FORMING APPARATUS

(75) Inventors: Minoru Hayasaki, Mishima (JP); Nobuyuki Uchiyama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 12/969,450

(22) Filed: Dec. 15, 2010

(65) Prior Publication Data
US 2011/0150522 A1 Jun. 23, 2011

(30) Foreign Application Priority Data

Dec. 21, 2009 (JP) .................................. 2009-288833
Nov. 18, 2010 (JP) .................................. 2010-258188

(51) Int. Cl.
*H02M 7/217* (2006.01)

(52) U.S. Cl.
USPC ............. 363/89; 363/21.14; 363/127; 399/88

(58) Field of Classification Search
USPC ................. 399/88; 363/21.06, 21.14, 127, 89
See application file for complete search history.

(56) References Cited

U.S. PATENT DOCUMENTS

| | | | |
|---|---|---|---|
| 6,711,130 B1 | 3/2004 | Sato | |
| 6,961,256 B2 * | 11/2005 | Yang | 363/127 |
| 7,262,977 B2 | 8/2007 | Kyono | |
| 7,408,796 B2 | 8/2008 | Soldano | |
| 7,768,808 B2 | 8/2010 | Soldano | |
| 2002/0034405 A1 * | 3/2002 | Kayahara et al. | 399/297 |
| 2005/0180178 A1 | 8/2005 | Yang | |
| 2008/0259649 A1 * | 10/2008 | Marchand et al. | 363/21.03 |
| 2009/0285001 A1 * | 11/2009 | Hu et al. | 363/126 |

FOREIGN PATENT DOCUMENTS

| | | |
|---|---|---|
| CN | 1965466 A | 5/2007 |
| JP | 2005-143287 A | 6/2005 |
| JP | 2005-151780 A | 6/2005 |
| JP | 4126558 B2 | 7/2008 |
| JP | 2009-273073 A | 11/2009 |

* cited by examiner

*Primary Examiner* — Gary L Laxton
(74) *Attorney, Agent, or Firm* — Canon USA, Inc. IP Division

(57) ABSTRACT

A power supply device controls drive of a synchronous rectification switch unit by converting a voltage into a current, and comparing a voltage obtained by current-to-voltage conversion with a predetermined value.

16 Claims, 11 Drawing Sheets

POWER SUPPLY DEVICE AND IMAGE FORMING APPARATUS

BACKGROUND OF THE INVENTION

1. Field of the Invention

The present invention relates to a switching power supply device and an image forming apparatus in which this power supply device is mounted.

2. Description of the Related Art

As an example of the switching power supply devices of the conventional synchronous rectification type, a circuit configuration is well known, which uses a comparator as illustrated in FIG. 10. In FIG. 10, this circuit includes a transformer 1001, a DC power supply, a primary side MOSFET 1003, a secondary side electrolytic capacitor 1004, a load 1005, a switching control circuit 1006, a synchronous rectification FET 1007 (hereafter referred to as an FET 1007), and a comparator 1008. After the MOSFET 1003 (hereafter referred to as an FET 1003) turns on to store energy in the transformer 1001, when the FET 1003 turns off, the voltage at the source terminal of the FET 1007 rises, so that the voltage of the plus terminal of the comparator 1008 becomes higher than the voltage of the minus terminal, and the FET 1007 turns on. A current flows through the FET 1007 and decreases to 0 A (0 ampere). When a current starts to flow from the plus terminal of the capacitor 1004 to the transformer 1001, the voltage at the minus input terminal of the FET 1007 becomes higher than the voltage at the plus input terminal, and the voltage at the gate terminal of the FET 1007 drops to turn the FET 1007 off. In the configuration described above, it becomes possible to control the on/off of the synchronous rectification FET 1007 by using a fewer component parts. Another synchronous rectification circuit can be configured by replacing the comparator in FIG. 10 with a circuit consisting of a PNP transistor and an NPN transistor, and by using a PNP transistor instead of the currently used MOSFET for the synchronous rectification switching element.

The circuit in FIG. 10 is based on a system of directly detecting a current flowing in the transformer. In contrast, as a way of not directly detecting a current, there is a method which utilizes an ET product of a transformer described in Japanese Patent No. 4126558 (a product of a pulse voltage by a pulse width of a pulse waveform that can pass through a transformer). FIG. 10 is a circuit diagram disclosed in Japanese Patent No. 4126558. In FIG. 10B, the circuit includes a transformer 1201, a power supply 1202, a primary side FET 1203, a synchronous rectification FET 1204, a secondary side electrolytic capacitor 1205, a load 1206, a first constant current supply 1207, a capacitor 1208, a second constant current supply 1209, a reference voltage 1210, a comparator 1211, and resistances 1212 and 1213. The constant current supply 1207 generates a current proportional to a voltage generated in the transformer 1201 for a period when the primary side FET 1203 is ON, and stores, as a voltage of the capacitor, an integrated value of voltage that appears in the transformer for a period when the FET 1203 is ON. The second constant current supply 1209 generates a current proportional to a voltage that appears for a period when the FET 1203 is off, and when the FET 1203 turns off, a switch 1217 turns on to discharge the voltage stored in the capacitor 1208. When the voltage of the capacitor 1208 drops to a predetermined value which is determined by a reference voltage 1210, the comparator 1211 operates to invert a logic circuit to turn off the synchronous rectification FET 1204.

To cite other examples, as discussed in Japanese Patent Application Laid-Open Nos. 2005-151780 and 2005-143287, there are a system in which a reference voltage supply is provided in series with an input terminal of the comparator, and another system in which a plurality of reference voltages serving as thresholds are provided to realize a hysteresis property to prevent malfunctioning of the circuit.

In a conventional configuration illustrated in FIG. 10, however, since the synchronous rectification FET has a small resistance between the drain and source when it is in the ON state. Therefore, if the drain-source voltage of the synchronous rectification FET is low, the FET is unable to operate correctly. Particularly when the secondary side synchronous rectification FET is operated under light load in power supply critical mode or in discontinuous mode, the current that flows in the FET decreases to almost 0 A. Therefore, the drain-source voltage of the synchronous rectification FET falls, making the FET unable to accomplish an OFF-to-ON transition correctly.

The above situation can be solved by using an FET with a high drain-source resistance for the synchronous rectification FET. However, in the FET with a high drain-source resistance, its efficiency decreases during a synchronous rectification. As it is expected that the drain-source resistance of the FET itself as a switch tends to decrease more and more, this situation may become more obvious in the future.

In Japanese Patent No. 4126558, since the current flowing in the transformer is not detected directly, the performance is not influenced by the drain-source resistance of the synchronous rectification FET. Since this power supply device uses an integrator, the circuit is less likely to malfunction and the circuit configuration is simple. However, a threshold value is to be adjusted so that OFF timing of the synchronous rectification FET is set to go with 0 A current. The adjustment of the threshold value is not easy. The reason is as follows. If an output voltage changes or load changes when power supply is turned on, an average value as a center value in charging or discharging of the capacitor changes, so that timing of a current becoming 0 A does not agree with turning off of the synchronous rectification FET. In other words, because the current is not detected directly, an estimation operation is performed, and the FET is to be turned off early to secure some time margin. This prolongs the conduction time of a body diode in the synchronous rectification FET and reduces the efficiency of operation.

SUMMARY OF THE INVENTION

An apparatus includes a rectify unit configured to rectify an input pulse voltage, a synchronous rectification switch unit, connected in parallel with the rectify unit, configured to rectify the pulse voltage, a voltage-to-current conversion unit, provided on the pulse voltage input side of the switch unit, configured to convert an input terminal voltage of the switch unit into a current, a current-to-voltage conversion unit configured to convert a current output from the voltage-to-current conversion unit into a voltage, and a comparator unit configured to control the operation of the switch unit according to a voltage output from the current-to-voltage conversion unit.

An image forming apparatus includes an image forming unit configured to form an image on a recording material, a control unit configured to control an operation of the image forming unit, a power supply unit configured to supply a voltage to the control unit, wherein the power supply unit includes a rectify unit configured to rectify an input pulse voltage, a switch unit, connected in parallel with the rectify unit, configured to rectify the pulse voltage, a voltage-to-current conversion unit, provided on the pulse voltage input side of the switch unit, configured to convert an input terminal voltage of the switch unit into a current, a current-to-voltage conversion unit configured to convert a current output from the voltage-to-current conversion unit into a voltage, and a comparator unit configured to control the operation of the switch unit according to a voltage output from the current-to-voltage conversion unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the invention will be described in detail below with reference to the drawings.

Figure 1:
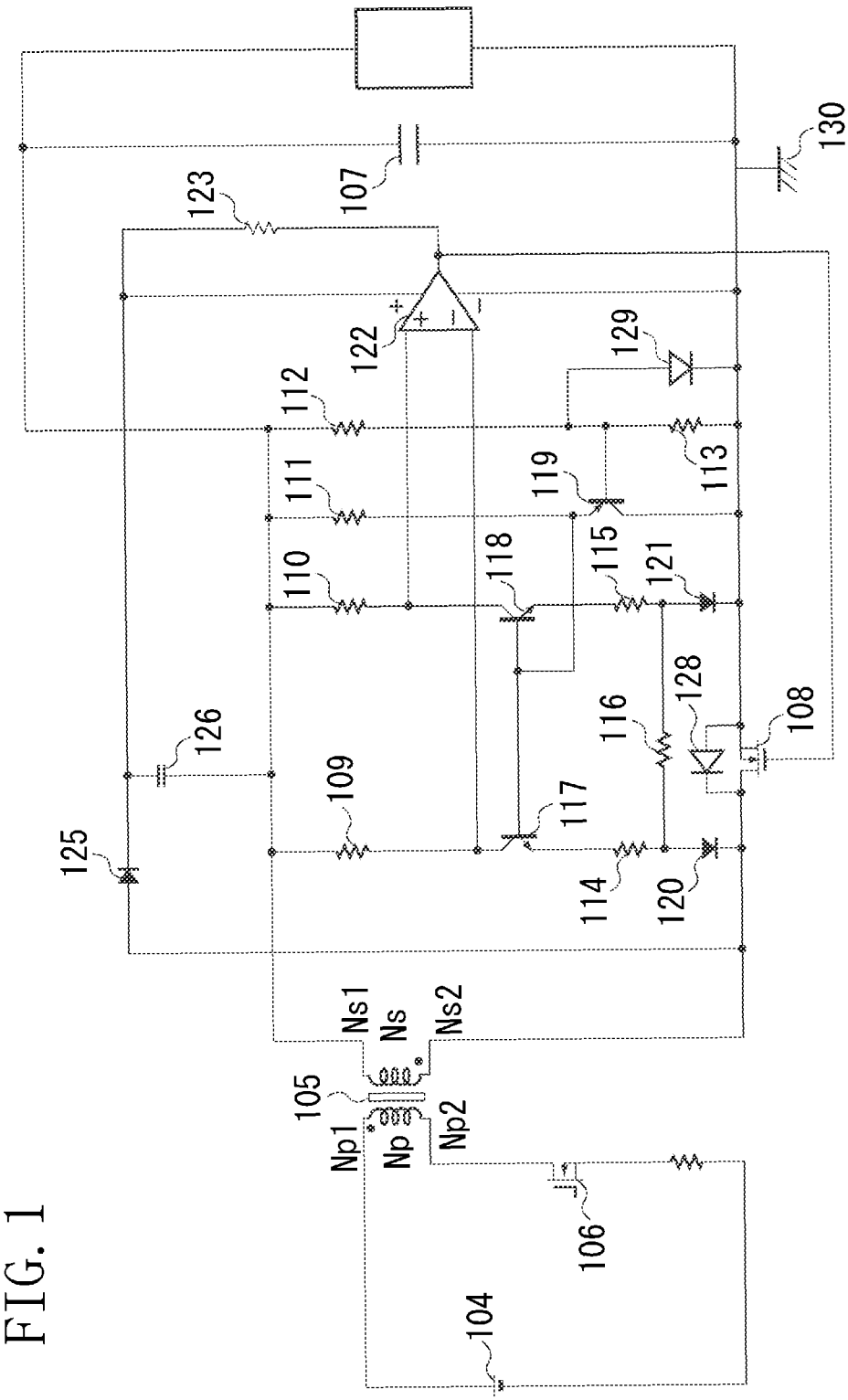
FIG. 1 is a circuit configuration diagram according to a first exemplary embodiment of the present invention.

A first exemplary embodiment of the present invention will be described. FIG. 1 illustrates a circuit configuration of a power supply device according to the first exemplary embodiment. In FIG. 1, only the parts related to the first exemplary embodiment are illustrated, and the other parts not related to this embodiment are omitted. More specifically, FIG. 1 illustrates a circuit after an AC input voltage (not illustrated) has been rectified into a DC voltage by passing through a filter circuit (not illustrated). In FIG. 1, a DC power supply or a primary electrolytic capacitor 104 is connected to the primary side (primary winding) of a transfer 105, and a pulse voltage is applied to the primary side of the transfer 105. A pulse voltage is output from the secondary side (secondary winding) of the transformer 105 according to the ratio of the winding numbers of the two coils. An FET 106 is a switching element on the primary side of the transformer 105. This FET is driven by a control IC (not illustrated), for example, so that the voltage of the secondary side is constant. Among the terminals of the primary winding Np, a terminal Np1 is connected to a plus terminal of the primary capacitor 104, and a terminal Np2 is connected to the drain of the switching element 106. When a voltage is applied to the primary winding Np with its plus voltage coupled to the Np1 and its minus voltage coupled to the Np2 and current flows, in the secondary winding Ns, a plus voltage appears at an Ns2 terminal and a minus voltage appears at an Ns1 terminal. A secondary side electrolytic capacitor 107 is connected to the Ns1 terminal of the secondary winding Ns and also to the plus terminal of the capacitor 107. In the first exemplary embodiment, an N channel FET is used, the source terminal is connected to the minus terminal of the electrolytic capacitor 107, and the drain terminal is connected to the Ns2 terminal of the secondary winding Ns. The circuit includes resistances 109, 110, 111, 112, 113, 114, 115, and 116, NPN transistors 117 and 118, a PNP transistor 119, and diodes 120 and 121. The circuit also includes a voltage comparator 122, a resistance 123, a diode 125, and a capacitor 126. A diode 128, which is termed a built-in diode or a body diode, is included in the synchronous rectification FET 108. Instead, a diode lower in forward voltage may be connected externally.

Figure 2:
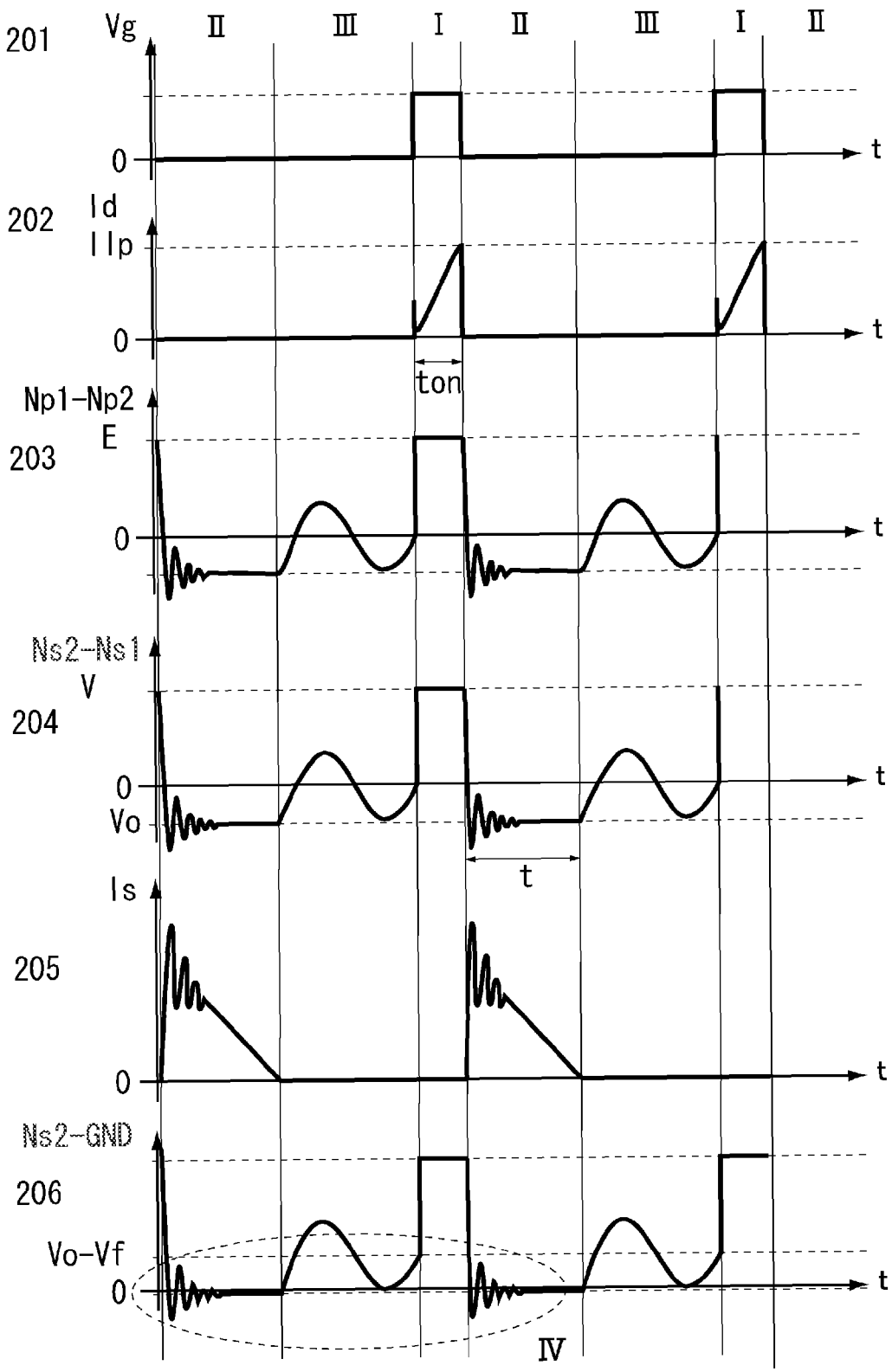
FIG. 2 is a diagram illustrating an operation waveform of the circuit according to the first exemplary embodiment of the invention.

FIG. 2 illustrates operation waveforms of various parts in the circuit in FIG. 1. When the FET 106 on the primary side turns on and a voltage is applied to the primary winding Np of the transformer, a current starts to flow in the direction from the primary electrolytic capacitor 104 to the primary winding Np of the transformer and from the drain to the source of the FET 106. A waveform 201 in FIG. 2 represents a gate-source voltage of the FET 106, and a waveform 202 represents a drain current Id of the FET 106. A time period when the FET 106 is ON is a time I in FIG. 2. During this time I, a voltage is applied to the primary electrolytic capacitor in a direction of putting the Np1 on a high potential side, as represented by a waveform 203 in FIG. 2, in the primary winding Np of the transformer 105.

A waveform 203 in FIG. 2 represents a voltage that appears on the Np of the transformer 105, in other words, the waveform 203 indicates a voltage Np1-Np2. At this time, a voltage is generated in the secondary winding Ns in a manner so that a voltage is higher at the Ns2 terminal than at the Ns1 terminal. A potential difference that appears in the secondary winding Ns represented by a waveform 204 in FIG. 2 is $E \times n2/n1$ if the winding number of the primary winding is $n1$, the number of the secondary winding is $n2$, and a voltage applied to the primary winding is E. A voltage produced by this potential difference causes the diode 125 to conduct, thus charging the capacitor 126.

If a forward voltage of the diode 125 is denoted by $Vf1$, a voltage across the capacitor 126 is $E \times n2/n1 - Vf1(V)$. On the other hand, owing to a diode 128 at the synchronous rectification FET 108, a current does not flow in the secondary side electrolytic capacitor. A current 205 in FIG. 2 flows in the secondary winding Ns. While the FET 106 is ON, the current flowing in the primary winding Np of the transistor 105 increases with passage of time. When an inductance of the primary winding Np is denoted by $Lp$ and a time elapses from when the primary side FET turns on is denoted by $tON$, a current $Ilp$ of the primary winding Np is $Ilp = E \times tON/Lp$. Energy stored in the transformer at this time is $2 \times Lp \times Ilp^2$.

If, after lapse of $tON$, the FET 106 is turned off, the energy stored in the transformer 105 is discharged from the secondary winding Ns (the voltage in the secondary winding Ns as indicated by a waveform 204 in FIG. 2). A time period II is a period from when the FET 106 turns off and energy is discharged from the transfer 105 to its secondary side. During the time period II, a voltage appears in the secondary winding Ns in a direction opposite to the direction when the FET 106 was ON. In other words, the voltage at the Ns1 terminal is higher than the voltage at the Ns2.

A forward voltage is applied to the diode 128 of the synchronous rectification FET 108, and the FET 108 turns on. A current that charges the secondary side electrolytic capacitor 107 flows from the Ns1 terminal of the secondary winding Ns of the transformer 105, passes through the plus terminal and the minus terminal of the capacitor 107, and further passes through the source and drain of the synchronous rectification FET 108, and flows to the Ns2 terminal of the secondary winding Ns. The current Is flowing to the secondary side decreases as the energy stored in the transformer 105 is discharges, and when the discharge of energy from the transformer ends, the current comes to 0 A (0 ampere).

When time when the current flowing to the secondary side reaches 0 A is denoted by t, the current that flows before the secondary side FET 106 turns off is denoted by Ilp, the secondary side inductance is denoted by Ls, and the secondary side voltage is denoted by Vo, we have Vo×t=Is×Ls. In this case, Is=n1/n2×Ilp. The current that flows to the secondary winding Ns and the synchronous rectification FET 108 becomes 0 A with passage of time t.

If the synchronous rectification FET 108 stays ON after that, a current flows from the plus terminal of the secondary side capacitor 107 to the Ns1 terminal and the Ns2 terminal of the secondary winding Ns, and from the drain-source channel of the synchronous rectification FET 108 to the minus terminal of the secondary side capacitor 107. Consequently, a voltage of the secondary winding Ns is applied to the secondary side capacitor 107, so that an induced voltage in the secondary winding (Np) appears as the voltage applied to the secondary winding (Ns) is multiplied by the ratio of the winding number. Accordingly, it appears as if a fly-back voltage is maintained. In other words, when the voltage of the secondary side capacitor 107 is denoted by Vo, a voltage that appears in the primary winding Np is Vo×n1/n2. Therefore, the drain-source voltage of the primary side FET 106 is E+Vo×n1/n2.

During a time period when the FET 106 is ON and the synchronous rectification FET 108 is off, the drain voltage is high and the source voltage is low in the synchronous rectification FET 108. When the primary side FET 106 is OFF and a voltage and a current are induced in the secondary winding Ns in a direction charging the secondary side capacitor 107, the diode 128 of the synchronous rectification FET 108 turns on. At this time, a voltage applied to the drain terminal of the FET 108 is the same as a voltage at the Ns2 terminal as illustrated by a waveform 206 in FIG. 2.

The cathode terminal of the diode 121 and the cathode terminal of the diode 120 are respectively connected to the source terminal and the drain terminal of the synchronous rectification FET 108. When a current flows to the FET 108, a voltage drop of the FET 108 causes the cathode voltages to change. A constant current supply circuit including the resistance 114 and the transistor 117 is connected to the diode 120, and a constant current supply circuit including the transistor 115 and the transistor 118 is connected to the diode 121. The one constant current supply circuit supplies a current set by a constant voltage circuit including the resistances 111 to 113 and a transistor 119 and by the cathode voltage of the diode 120. The other constant current supply circuit supplies a current set by the same constant voltage circuit and by the cathode voltage of the diode 121. The current of the former constant current circuit is converted by the resistance 109 into a voltage which is input to the minus terminal of the comparator 122 and the current of the latter constant current circuit is converted by the resistance 110 into a voltage which is input the plus terminal of the comparator 122.

Figure 3:
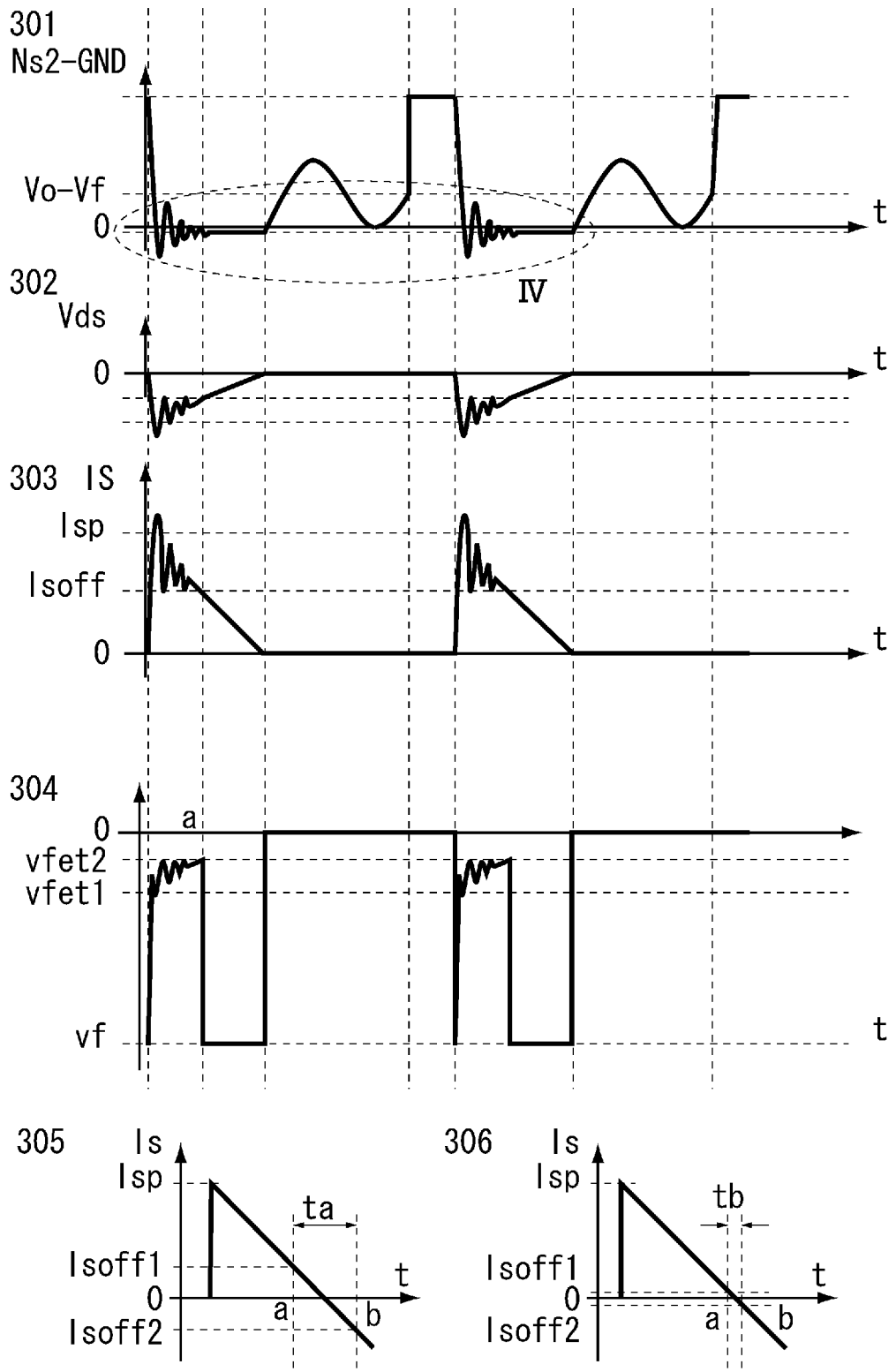
FIG. 3 is a diagram illustration an operation waveform of the circuit according to the first exemplary embodiment of the invention.

FIG. 3 illustrates voltage waveforms when the voltage across the synchronous rectification FET 108 is Vf2 as a forward voltage of the diode 128, and the synchronous rectification FET turns on by output of the comparator 122. The drain-source voltage of the synchronous rectification FET 108 is a drain-source resistance value×Is. FIG. 3 illustrates a voltage waveform 302 between the drain and source of the synchronous rectification FET 108 at this time. A current waveform 303 indicates a current flowing in the synchronous rectification FET 108 at this time. In the current waveform 303, the direction in which a current flows from the source to the drain of the FET 108 is designated as the plus side.

As illustrated in the waveform 303, since the current Is approaches 0 A over time, the drain-source voltage of the FET 108 also approaches 0 V. For example, if it is assumed that the drain-source resistance of the FET 108 in the ON state is 10 mΩ and a current at a given time is 1.0 A, the voltage across the FET 108 is 10 mV, which is close to an offset voltage of the comparator. If the comparator is assumed to operate at ±10 mV, it follows therefore that the synchronous rectification FET 108 turns off at voltage values between Isoff1 and Isoff2 as illustrated in a waveform 305 in FIG. 3. A time to in the diagram 305 indicates a range of timing for turning off the synchronous rectification FET 108.

If the comparator should operate by a current of Isoff1 at time a in the waveform 305, the diode of the FET 108 conducts at a time later than time a. In this case, the voltage across the FET 108 rises up to a forward voltage Vf2 of the diode 128, and a loss of the FET 108 increases and its efficiency decreases. The voltage across the FET 18 at this time is as illustrated in the waveform 304 in FIG. 3 (energy is discharged to the secondary side between Vfet1 and Vfet2). It can be seen from the waveform that when the FET 18 turns off (at timing a), the voltage across the FET 108 rises up to Vf.

If the comparator operates slowly, the FET 108 turns off at timing b in a waveform 305. A current in minus direction Isoff2 flows in the FET 108. In other words, a current flows from the secondary side capacitor 107 to the secondary winding Ns. This current flows through the body diode (not illustrated) of the primary side FET 106 when the FET 106 is off and becomes a wattles current flowing from the primary winding of the transformer 105 to the primary electrolytic capacitor 104, thus contributing to a decrease in the efficiency. A waveform 310 in FIG. 3, which is the same as the waveform 206 in FIG. 2, is a voltage applied to the synchronous rectification FET 108.

A concrete operation of a system of voltage-to-current conversion and current-to-voltage conversion according to this exemplary embodiment will be described below. As in the foregoing description, it is supposed that the drain-source resistance of the FET 108 in the ON state is 10 m and the current is 1.0 A. If the voltage across the resistance 113 is 1.0V and the forward voltages of the diodes 120 and 121 are each 0.6 V, Vbe (base-emitter voltage) of the transistor 119 and Vbe of the diodes 118 and 117 cancel out each other, and a base voltage of the transistor 119 appears as a base voltage of the transistors 117 118. Therefore, the voltage across the resistance 114 is 0.41 V and the voltage across the resistance 115 is 0.40 V.

If the resistances 114, 115 are 10 kΩ each, a current of 41 μA flows in the resistance 114 and a current of 40 μA flows in the resistance 115. If the resistances 109, 110 are 80 kΩ each, the voltage across the resistance 109 is 3.28 V and the voltage across the resistance 110 is 3.2 V, so that a voltage difference between the input terminals of the comparator is 80 mV. When the current falls and becomes 0.125 A, and the voltage between the input terminals of the comparator is 10 mV, which is equivalent to a voltage when the voltage-to-current conversion circuit and the current-to-voltage conversion circuit are not interposed in the circuit. In other words, a voltage gain is eight times higher.

A current range in which the synchronous rectification FET 108 according to the exemplary embodiment is OFF is tb in the graph 306 in FIG. 3. As illustrated in the graph 306 in FIG. 3, a current width between a maximum current Isoff1 and a minimum current Isoff2, in which the comparator 122 operates is narrow. Even if the comparator 122 should turn on at a large current (in other words, earlier), a time period in which a current is made to flow in the diode 128 of the synchronous rectification FET 108 is short and its amount is small, so that the efficiency does not decrease much. Even when the comparator 128 turns on at a small current (tardily), a wattles current is reduced, so that the decrease in efficiency can be reduced.

When the comparator 122 makes an inversion operation, the synchronous rectification FET 108 turns off, cutting off the Ns2 terminal of the transformer 105, and as a result, resonance occurs caused by energy in the transformer and floating capacitances of the transformer, the primary side FET 106, and the synchronous rectification FET 108. In this exemplary embodiment, a power supply voltage of the comparator 122 is generated by the diode 125 and the capacitor 126 connected to the Ns2 terminal of the secondary winding Ns of the transformer 105. For this reason, compared with a case where an output voltage on the secondary side is used as power supply, it becomes possible to operate the comparator 122 more quickly and expand an in-phase input range of the comparator 122 in a low-voltage operation. For example, when an output voltage of 3.3 V of power supply is used for power supply of the comparator, since a possible operation range of the input terminals of the comparator is normally a power supply voltage −1.5 V, the comparator can operate up to input of a maximum of 1.8 V. Under this condition, gain of the current-to-voltage conversion circuit cannot be increased. On the other hand, when an output voltage of 3.3 V of power supply is used and a power supply voltage from the Ns2 terminal is 10 V, the comparator can operate up to input of a maximum of 8.5 V.

A diode 129, connected in parallel with the resistance 113 as the reference voltage generation circuit, is provided on the output side (load side) of the synchronous rectification FET 108. In this configuration, when an output voltage of power supply changes greatly between 24 V in normal mode and 3.3 V in standby mode (light load), the FET 108 can maintain a stable operation even if the current detection value is changed. In other words, by increasing a regenerated current from the secondary side to the primary side when the output voltage is 24 V in normal mode, the switching loss of the primary side FET 106 is reduced in critical or continuous mode, thereby improving the efficiency. It is possible to perform an operation to minimize a regenerated current when the output voltage is 3.3 V to reduce a wattles current, and improve the efficiency in discontinuous mode under light load. An example of the operation will be described below.

A current reference is set by voltage division by resistances when 3.3 V is output. Because of voltage division among the resistances, the voltage of this resistance (a voltage dividing resistance) changes when output voltage is changed. If a diode is connected in parallel with the resistance, when a voltage across the resistance rises and becomes higher than a forward voltage Vf of the diode, the voltage across the resistance is clamped to the voltage Vf, the reference current comes to stop changing even if the power supply voltage further rises. Under this condition, in a low voltage output state in standby mode (light load), such as when 3.3 V is output, a regenerative action from the secondary side capacitor to the secondary winding Ns of the transformer 105 is minimized, but when a high voltage, such as 24 V, is output, the regenerative action is performed. By this arrangement, the efficiency can be improved. Needless to say, to enable a stable operation, a shunt regulator or a zener diode may be used to obtain a reference voltage.

The current detection accuracy is greatly influenced by variations in Vbe (base-emitter voltage) of the transistors 117, 118 and also in forward voltage Vf of the diodes 120, 121 used in this exemplary embodiment. Therefore, transistors and diodes with high pairing property (elements with similar properties) are used. They can be caused to operate in similar way when mounted in the same IC. If pair transistors and pair diodes are used, which are produced as elements included in the same IC package, they can be treated as having the same values when they are used. As described above, in this exemplary embodiment, since the power supply device is formed in a circuit configuration illustrated in FIG. 1, the power supply device can exhibit an improved efficiency and a stable operation in standby mode (light load) when 3.3V is output, and also in normal mode when 24 V is output.

Figure 4:
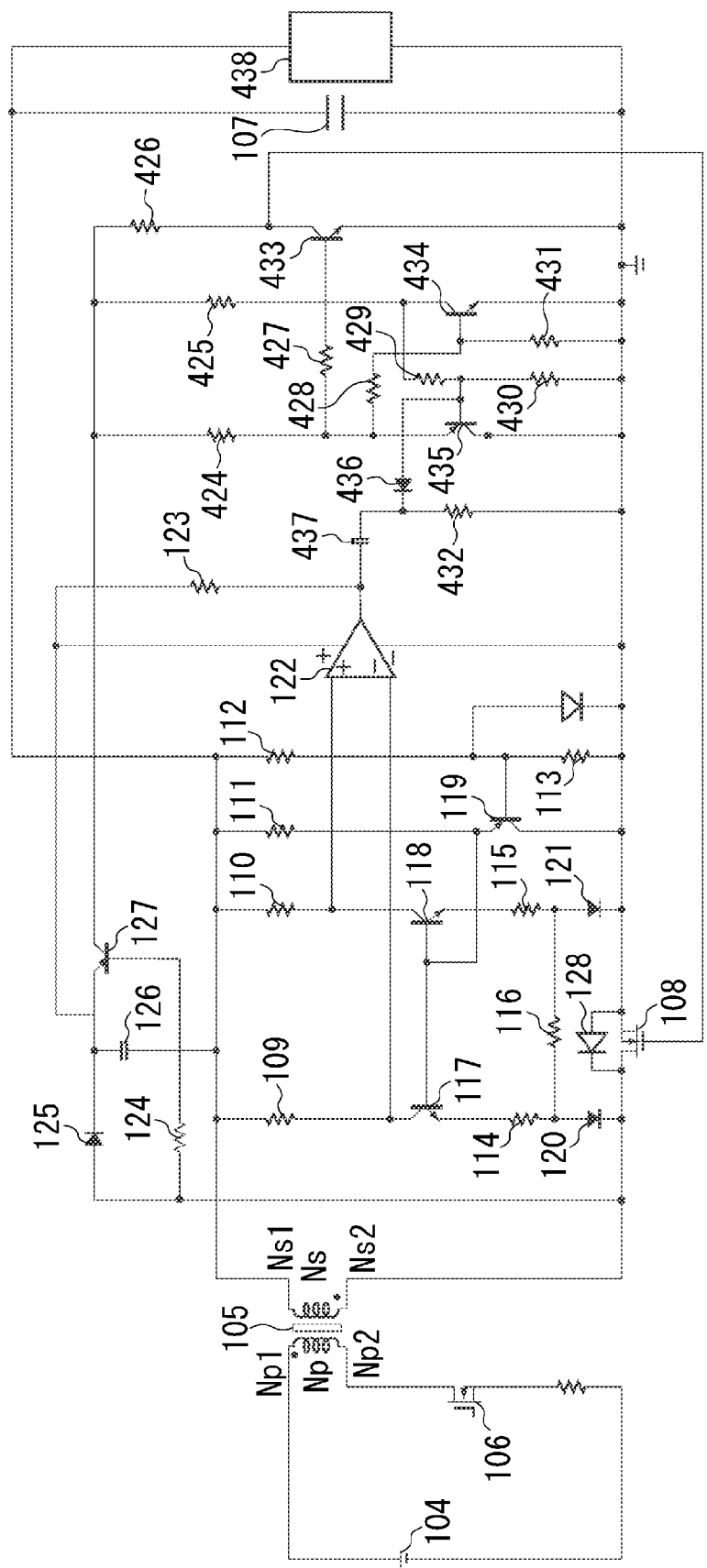
FIG. 4 is a circuit configuration diagram according a second exemplary embodiment of the invention.

A second exemplary embodiment of the present invention will next be described. The circuit configuration according to the second embodiment is illustrated in FIG. 4. In FIG. 4, an AC power supply 401 is configured to receive commercial AC power. Descriptions of blocks common to the first exemplary embodiment are omitted, and operations characteristic of the second exemplary embodiment will be described below.

A circuit illustrated in FIG. 4 includes a filter circuit 402, a rectification bridge diode 103, a primary electrolytic capacitor 104, a transformer 105, and a MOSFET (hereafter referred to as FET 106). The primary winding Np of the transformer 105 has the Np1 terminal connected to the plus terminal of the primary electrolytic capacitor 104, and the Nps terminal connected to the drain terminal of the FET 106. When a voltage is applied to the primary winding Np with plus voltage coupled to an Np1 and minus voltage coupled to the Np2, and current flows, in the secondary winding Ns, a plus voltage appears at the Ns2 terminal and a minus voltage appears at the Ns1 terminal.

The secondary side electrolytic capacitor 107 is connected to the Ns1 terminal of the secondary winding Ns and also to the plus terminal of the capacitor 107. For the synchronous rectification FET, an N-channel FET is used, its source terminal is connected to the minus terminal of the electrolytic capacitor 107, and its drain terminal is connected to the Ns2 terminal of the secondary winding Ns. The circuit includes the resistances 109 to 116, the NPN transistors 117, 118, and the PNP transistor 119.

The circuit further includes the diodes 120, 121, 125, the comparator 122, the resistance 123, and the capacitor 126. The diode 128 (also referred to as a body diode) is built in or externally added to the synchronous rectification FET 108. A resistance 124 and a PNP transistor 127 are added in this exemplary embodiment. Other newly added parts are resistances 424, 425, 426, 427, 428, 429, 430, 431, and 432, NPN transistors 433, 434, 435, a diode 436, and a capacitor 437.

The Ns2 terminal of the secondary winding Ns in the transformer is connected to an anode of the diode 125, and a cathode of the diode 125 is connected to the plus terminal of the capacitor 126, and also to an emitter of the transistor 127.

The minus terminal of the capacitor 126 is connected to a terminal after output of the secondary winding of the transformer has been rectified, but may be connected to the ground terminal (the source terminal of the synchronous rectification FET). The base terminal of the transistor 127 is connected through the resistance 124 to the anode terminal of the diode 125.

In FIG. 4, when the primary side FET 106 turns on, a higher voltage is generated at the Ns2 terminal than at the Ns1 terminal of the secondary winding Ns of the transformer. This voltage is obtained by a voltage applied to the primary winding Np of the transformer multiplied by the ratio of winding numbers between the primary winding and the secondary winding. By a voltage that appears at the secondary winding for a time period that the FET 106 is ON, the diode 125 conducts, causing the voltage across the capacitor 126 to rise. At this time, the base of the transistor 127 is at the same voltage as the voltage of the Ns2 of the secondary winding, which is lower by an amount of the forward voltage of the diode 125 than the voltage at the emitter terminal of the transistor 127, so that the transistor 127 does not conduct. When the primary side FET 106 turns off, the voltage at the Ns2 terminal of the secondary winding of the transformer becomes lower than the voltage at the Ns1 terminal. At this time, because the diode 125 is OFF, the voltage at the emitter terminal of the transistor 127 remains unchanged, and the base voltage of the transistor 125 falls, turning the transistor 127 off.

When the transistor 127 turns on, voltages occur at resistances 430, 431 by voltage division. Because it has been set such that a voltage at the resistance 430 is higher than a voltage at the resistance 431, the base voltage of the transistor 435 is higher than the base voltage of the transistor 434. Therefore, the transistor 435 turns on and the transistor 433 turns off, and the synchronous rectification FET 108 turns on. A flip-flop is formed by the transistor 434 and the transistor 435. When the comparator 122 operates, a signal is supplied through a capacitor 437 and a diode 436 to keep the base voltage of the transistor 435 at low level for a fixed time. When the transistor 435 turns off, the transistor 434 turns on, causing the base voltage of the transistor 435 to stay at a low level, so that the collector terminal of the transistor 435 is at a high level.

When the collector voltage of the transistor 435 goes to the high level, the transistor 433 turns on, and the gate voltage of the FET 108 goes to the low level. Consequently, power supply to a synchronous rectification control circuit is obtained when the Ns2 terminal voltage of the secondary winding Ns of the transformer rises, and the synchronous rectification FET 108 turns on when the Ns21 terminal voltage of the secondary winding Ns of the transformer rises. When it is detected that the current of the FET 108 comes close to 0 A, the FET 108 turns off. The circuit, including the transistors 434, 435, and 433, functions as a second voltage-to-current conversion circuit, and the circuit, including the resistances 424, 425, functions as a second current-to-voltage conversion circuit. The FET can turns on without a delay in operation of the comparator, which is made possible by those conversion circuits.

As described above, in the second exemplary embodiment, which uses the circuit configuration illustrated in FIG. 4, the moment a voltage is applied to the FET for synchronous rectification, the FET can turn on. In other words, the FET operation is not influenced by the operation delay in the comparator. Therefore, loss that is incurred during synchronous rectification can be reduced and the efficiency of power supply can be improved.

Figure 5:
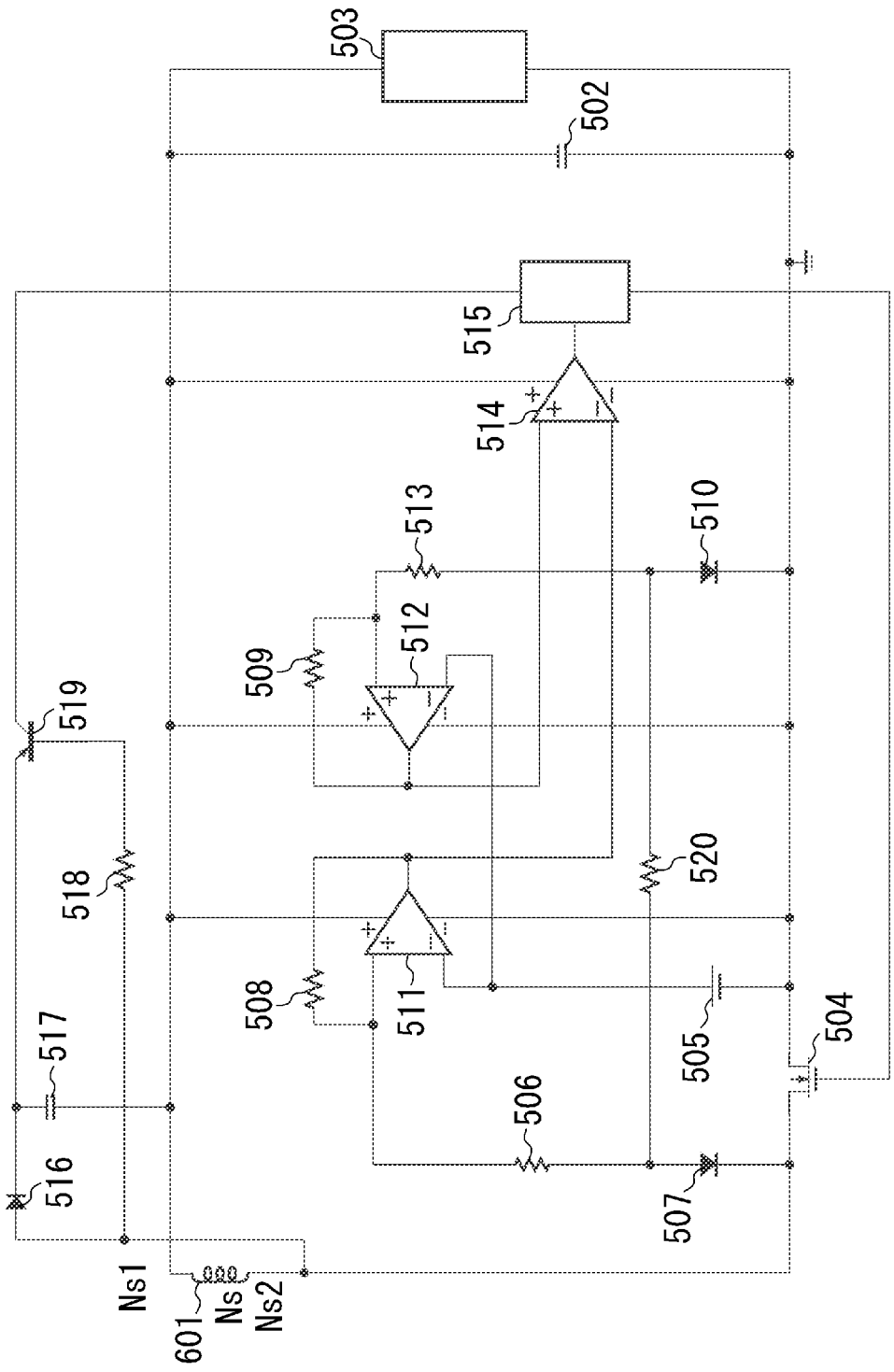
FIG. 5 is a circuit configuration diagram according to a third exemplary embodiment of the invention.

A third exemplary embodiment of the present invention will be described. FIG. 5 illustrates a circuit configuration of the third embodiment. Descriptions of blocks common to the first exemplary embodiment are omitted, and operations characteristic of the third exemplary embodiment will be described below.

The secondary winding Ns is included in a transformer 501. The Ns1 terminal of the secondary winding Ns is connected to the plus side of the secondary side capacitor 502. A load 503 is connected to a synchronous rectification FET 504. The circuit in FIG. 5 includes resistances 506, 508, 509, 513, 518, and 520, a voltage supply 505, diodes 507, 510, and 516, OP Amps 511, 512, a comparator 514, and a flip-flop 515. The circuit also includes a capacitor 517, a transistor 519, and a built-in or externally connected diode 521 (the built-in diode is often referred to as a body diode) for a synchronous rectification FET 504.

In the third exemplary embodiment, an input terminal of the Op Amp is connected to a voltage supply 505 which outputs a voltage V1. The other input terminal of the Op Amp 511 is connected through the resistance 506 and the diode 507 to the secondary winding Ns of the synchronous rectification FET 504. In other words, a voltage from the secondary winding side to the input side of the synchronous rectification FET 504 is detected and converted into a current. A voltage V1 is applied to the resistance V1 to adjust an output voltage of the Op Amp so that the voltage of the input terminal can be the same level as the output voltage. Therefore, when a resistance value of the resistance 508 is designated as R508, a resistance value of the resistance 506 is designated as R506, the drain-source resistance of the synchronous rectification FET 504 in ON-state is designated as Rdon (Ω), a current flowing from the minus terminal of the capacitor 502 to the Ns2 winding of the transformer 501 by I (A), and a forward voltage of the diode 507 is designated by Vf1, an output voltage Vo1 of the Op Amp 511 will be expressed by equation (1) below.

$$Vo1 = (V1 - Vf1 + I \times Rdon) \times (R506 + R508)/R506 (V) \quad (1)$$

On the other hand, the output voltage of the Op Amp 512 will be expressed by equation (2) below.

$$Vo2 = (V1 - Vf2) \times (R513 + R509)/R513 (V) \quad (2)$$

where R513 and R509 are resistance values of the resistances 513, 509, and Vf2 is a forward voltage of the diode 510.

Voltages are amplified by the resistances 508, 506, 513, and 509, and outputs of the Op Amps, in other words, outputs obtained by current-to-voltage conversion are input to the comparator 514. The anode terminal of the diode 507 and the anode terminal of the diode 510 are connected by the resistance 520, and this connection is maintained even if the voltage of the Ns2 terminal rises higher than the minus terminal voltage of the capacitor 502 when the secondary winding current is inverted or the FET 504 turns on. The diode 507 is used to protect the Op Amp or not to allow a wasteful current to flow when the voltage of the Ns2 terminal rises. If there is not any problem about a voltage rise, the diode 507 may be omitted. The diode 510 is used to secure a balance against a forward voltage that is generated when the diode 507 is used. If the diode 507 is not required, the diode 510 may be omitted.

The anode terminal of the diode 516 is connected to the Ns2 terminal of the secondary winding Ns. The cathode terminal of the diode 516 is connected to the capacitor 517, and the other terminal of the capacitor 517 is connected to the Ns1 terminal of the secondary winding Ns of the transformer 501. The capacitor 517 is charged by a voltage that is generated when a primary side FET (not illustrated) is ON. The cathode terminal of the diode 516 is connected to the emitter terminal of the transistor 519, and the base terminal of the transistor 518 is connected to the anode terminal of the transistor 519. When the primary side FET (not illustrated) turns off, the voltage of the Ns2 starts to fall, and the transistor 519 turns on, supplying a voltage to the flip-flop 515. In response to this voltage used as power or a timing signal, the flip-flop 515 operates to turn on the synchronous rectification FET 504.

The flip-flop 515 also operates to turn off the synchronous rectification FET in response to output of the comparator 514. Power to the flip-flop 515 is supplied from the transistor 519. In some other circuit configuration, power may be supplied from the terminal voltage (output voltage of power supply) of the capacitor 502. Alternatively, power may be supplied from the emitter of the transistor 519. With regard to voltage supply to the comparator 514, though a terminal voltage of the capacitor 502 is used in this third exemplary embodiment, power may be supplied from the emitter of the transistor 519. In this third exemplary embodiment, the minus terminal of the capacitor 517 is connected to the Ns1 terminal, but may be connected to the minus terminal of the capacitor 502.

As described above, in this third exemplary embodiment, by using the circuit configuration in FIG. 5, similar to the first exemplary embodiment, the efficiency can be improved and a stable operation can be secured both under light load (3.3V is output) and in normal mode (24V is output).

Figure 6:
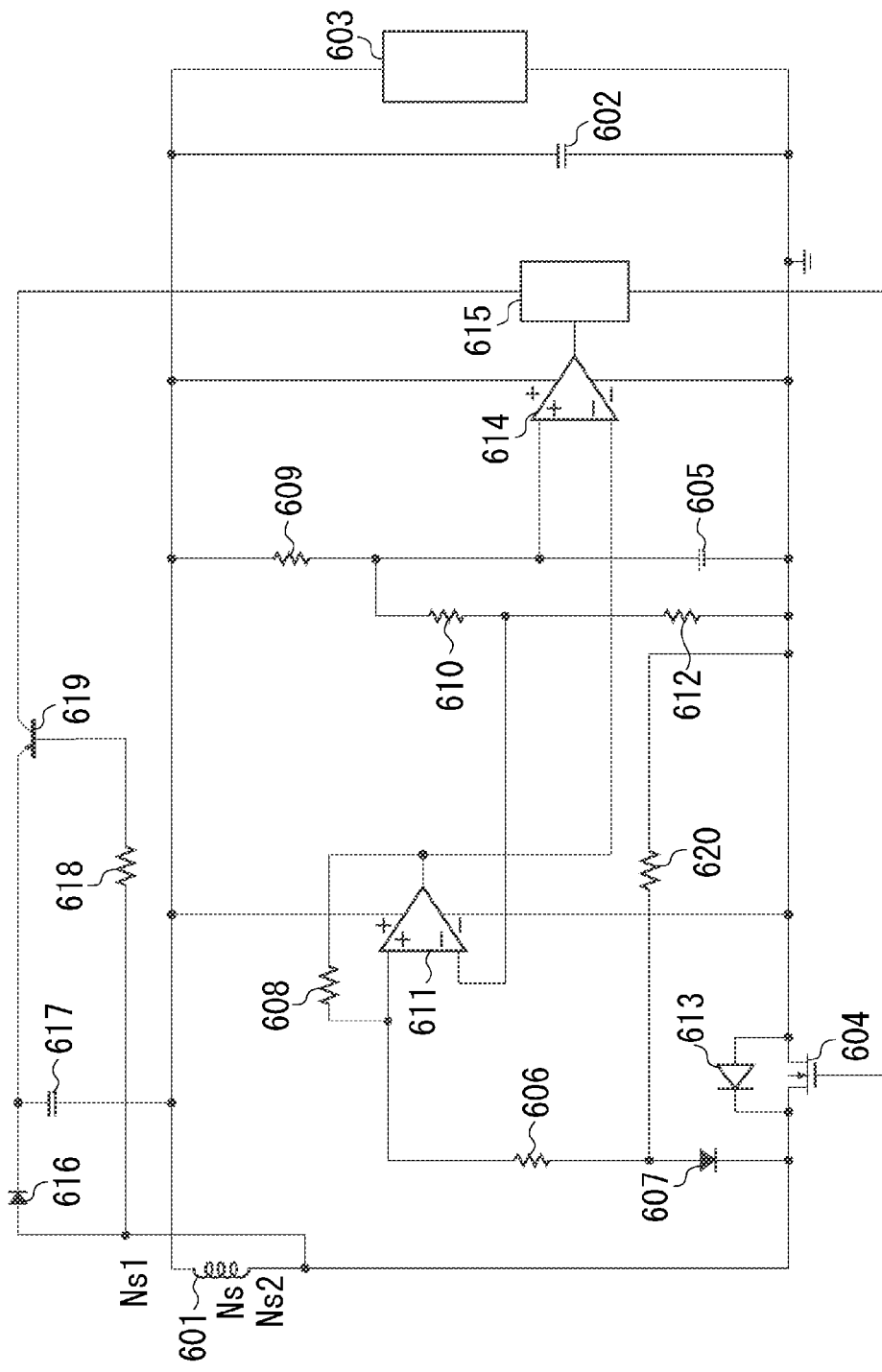
FIG. 6 is a circuit configuration diagram according to a fourth exemplary embodiment of the invention.

A fourth exemplary embodiment of the present invention will be described. FIG. 6 illustrates a circuit configuration according to the fourth exemplary embodiment. FIG. 6 illustrates a circuit configuration in which the second voltage-to-current conversion circuit and the second current-to-voltage conversion circuit of the second exemplary embodiment (FIG. 4) have been replaced by a reference voltage supply. In other words, a threshold voltage for the comparator is given by using a constant voltage source 605 and a resistance 609, and at the same time, a voltage as a reference is given to the current supply of the first voltage-to-current conversion block by voltage division between the resistances 610, 612.

In an Op Amp 611 of the first voltage-to-current conversion block, an output voltage is changed so that a voltage at the input terminal connected to the resistance 606 can be the same level as a voltage that appears by voltage division between the resistances 710, 612. For example, if a voltage of the resistance 612 is 1.0 V and Vf of the diode 607 is 0.6 V, a voltage is applied to the resistance 606 in an amount corresponding to 0.4 V+a voltage drop in the synchronous rectification FET 604. If a resistance value of the resistance 606 is 10 kΩ and a voltage drop in the synchronous rectification FET 604 is 0.1 V, a voltage of 0.5 V is applied to the resistance 606, so that a current of 50 μA flows. Since this current flows also to the resistance 608, if R608 is 100 kΩ, 5.0 V is applied to the R608. In other words, the output voltage of the Op Amp is 5.4 V.

When the resistance value of the resistance 608 is designated as R608 and the resistance value of the resistance 606 is designated as R606, the voltage Op Amp outputs a voltage, which is higher by an amount of (R608+R606)/R606 than an input voltage. As a result of comparison between this voltage and a predetermined value by the comparator, the synchronous rectification FET 604 turns off. If a voltage of the synchronous rectification FET is 10 mV, according to a calculation described above, the voltage across the resistance 606 is 0141 V, the current is 41 μA, and the voltage of the resistance R608 is 4.1 V. Therefore, the output voltage of the Op Amp is 4.5 V.

When the synchronous rectification FET 604 turns off, and the voltage of the Ns2 terminal of the secondary winding Ns rises, causing the diode 607 to turn off, the current, which has been flowing through the resistance 606, flows through the resistance 620 to the minus terminal of the capacitor 602. For example, if a resistance nine times higher than the resistance 606 is used for the resistance 620, when 0.4 V is applied to the resistances 620, 606, 4.0 μA flows through the resistances 620, 606, and a voltage across the resistance R608 is 0.4 V. Therefore, an output voltage of the Op Amp is 0.8 V and there is no problem when the synchronous rectification FET 604 turns off.

When the power supply device is provided with a standby mode in which a light load is used and an operation mode in which a normal load is used, it is possible to configure the circuit in which the resistance 612 is connected to a series circuit including a resistance and a transistor (or an FET), or the reference voltage 605 is provided with a circuit to change the reference voltage which changes timing for turning off the synchronous rectification FET based on an operation mode change signal or a size of a load current. In standby mode, the synchronous rectification FET can turn off when the current of the synchronous rectification FET becomes 0 A. In normal load mode or when a load current is large, the synchronous rectification FET can turn off when the current of the synchronous rectification FET is minus, in other words, after a current comes to flow from the plus terminal of the secondary side capacitor 602 to the Ns1 terminal of the secondary winding of the transformer 601. Under this arrangement, while the primary side FET is operating in critical mode or in continuous mode, when the primary side FET turns on, a reverse conducting diode allows a regenerative current to flow to protect the FET. In other words, switching loss on the primary side can be reduced and the power supply can be made to perform operation with high efficiency.

Figure 7:
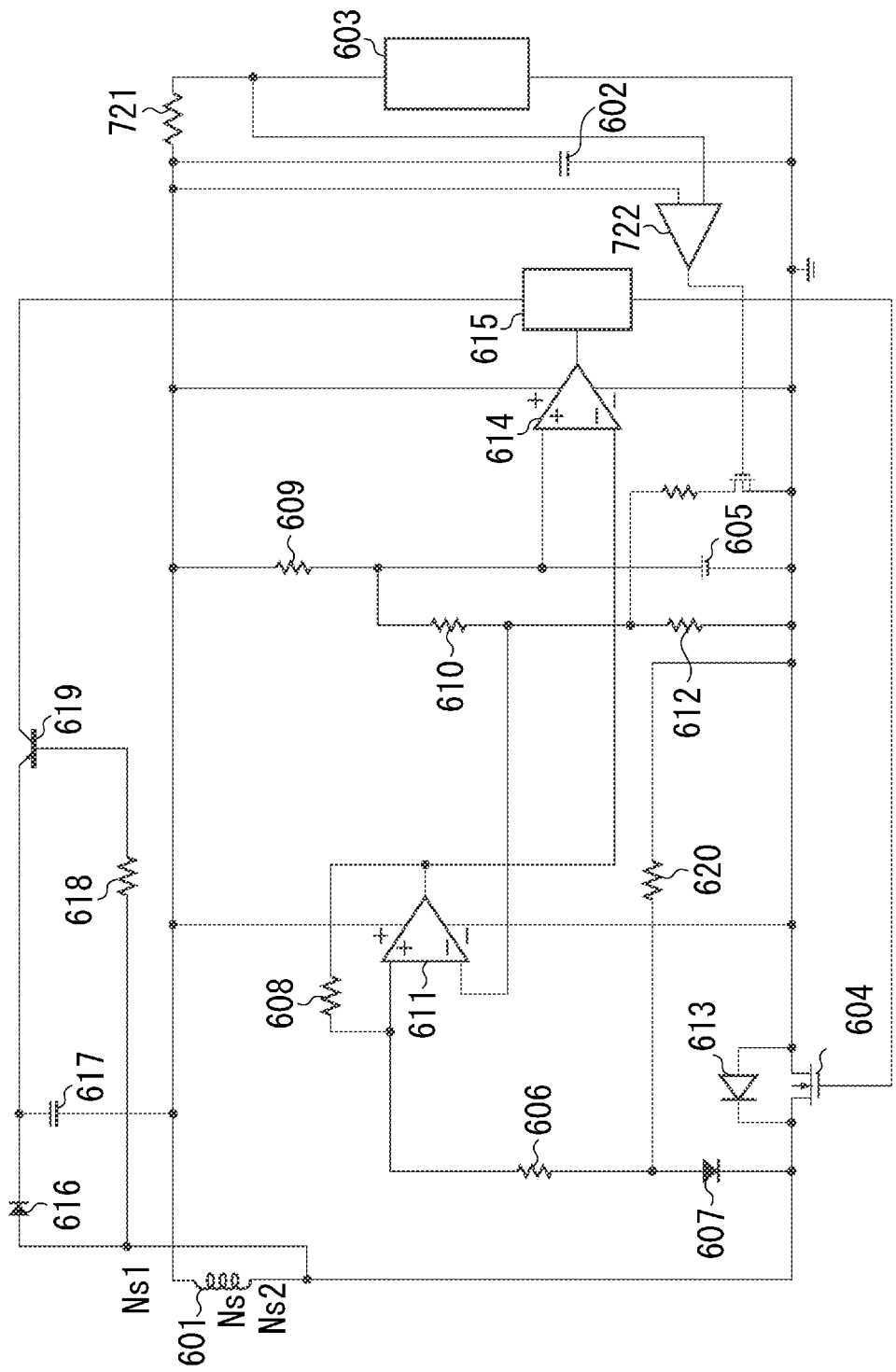
FIG. 7 is a modified circuit diagram to change a threshold value according to the fourth exemplary embodiment of the invention.
Figure 8:
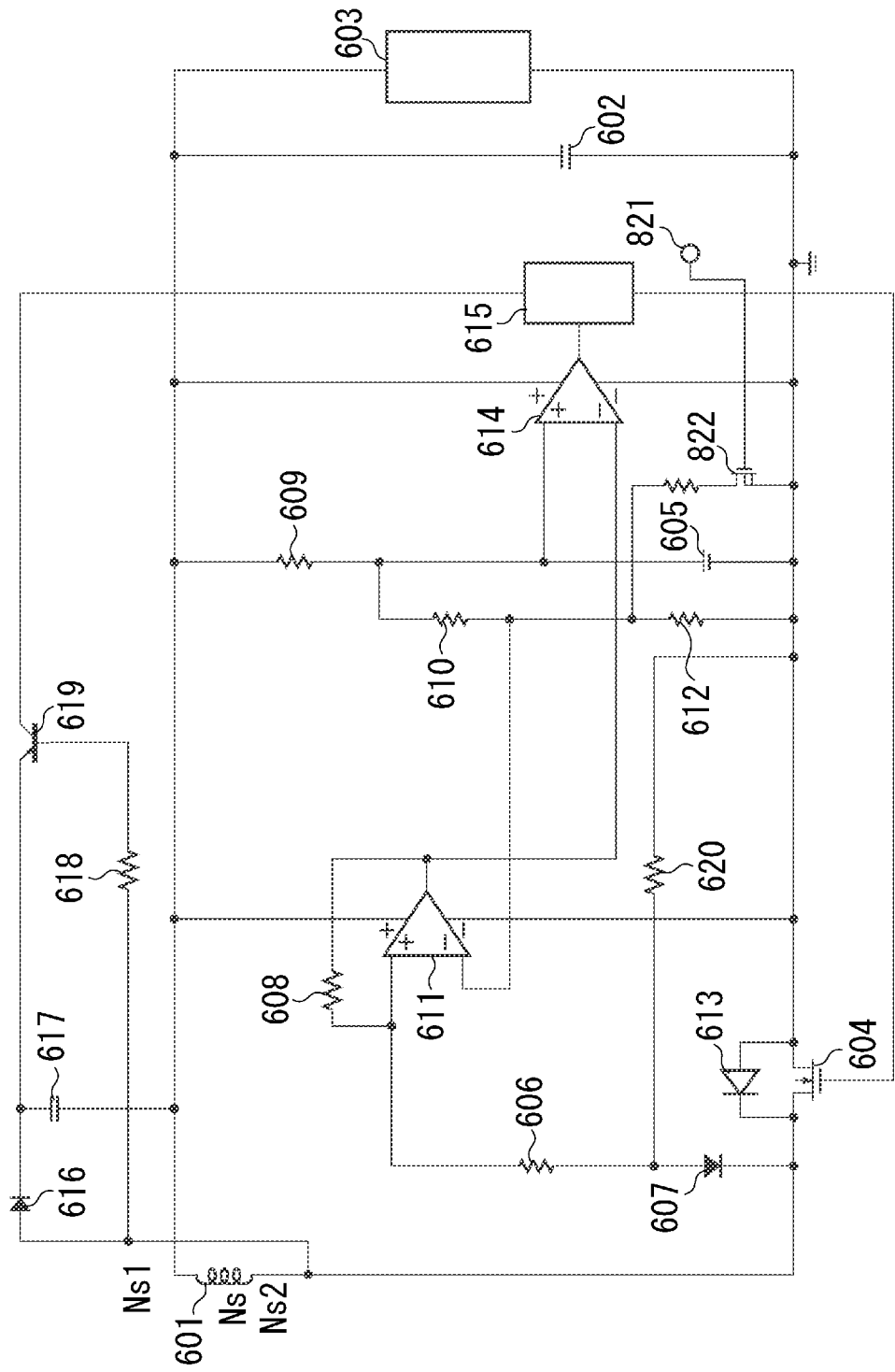
FIG. 8 is a modified circuit diagram to change the threshold value according to the fourth exemplary embodiment of the invention.

Examples of the circuit configured as described above are illustrated in FIGS. 7 and 8. In FIG. 7, a voltage of a current detection circuit 721 is detected, and a threshold value is changed by using a comparator 72 and an FET 723. In FIG. 7, a voltage across the current detection resistance is detected directly, but a bridge circuit may be formed and a voltage across the resistance may be detected. FIG. 8 illustrates a circuit configuration in which a signal 821 generated when modes are changed is input from outside of the power supply, and a threshold value is switched by the FET 822. It is arranged that a threshold value switching signal is input simultaneously with a mode transition, or after a predetermined time lapses from when the device starts to switch modes.

Figure 9:
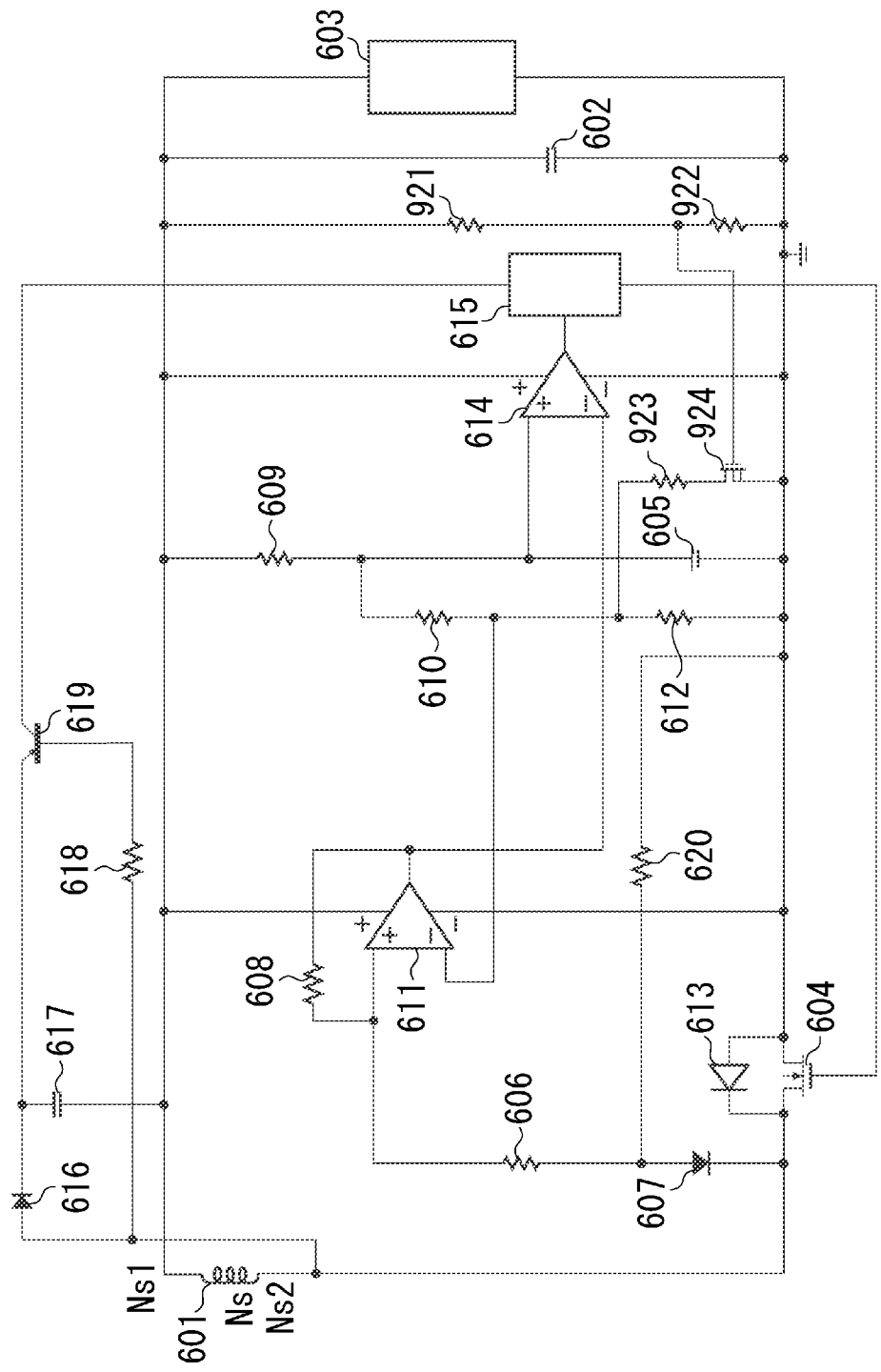
FIG. 9 is a modified circuit diagram to change the threshold value according to the fourth exemplary embodiment of the invention.
Figure 10A:
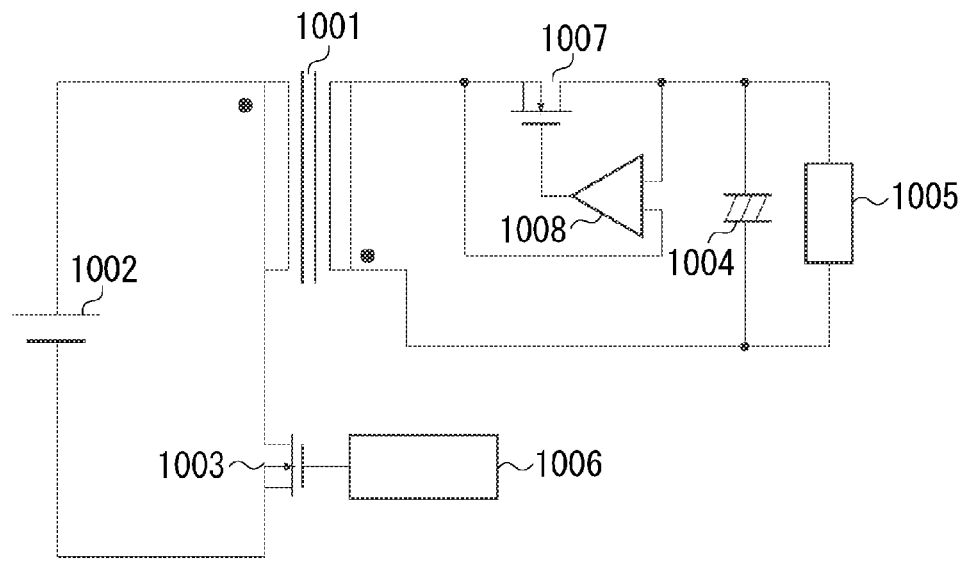
FIGS. 10A and 10B illustrate circuit configurations of prior art.
Figure 10B:
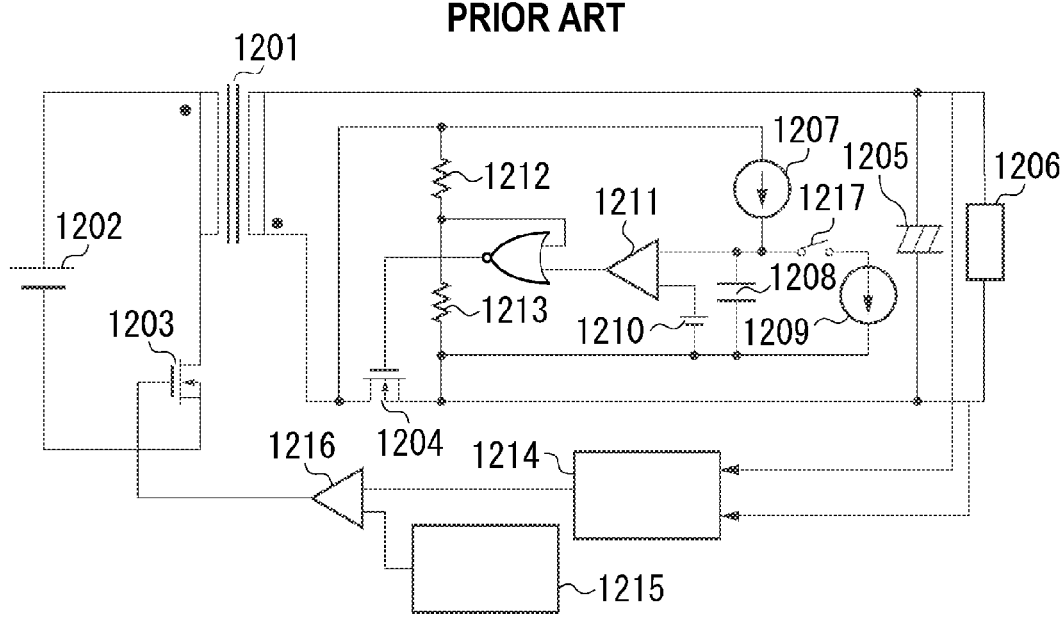

FIG. 9 illustrates a circuit configuration in which when the power supply changes an output voltage in normal mode or in standby mode, an output voltage is detected by using resistances 921, 922, and the reference voltage value of the comparator is changed or the reference voltage value of the voltage-to-current conversion circuit is changed by an FET 924 and a resistance 923. In the manner described above, timing for turning off the synchronous rectification FET is changed. It is possible to modify the circuit configuration to change timing for turning off a synchronous rectification FET by changing a threshold value.

Similar to the first exemplary embodiment, in this fourth exemplary embodiment, if any of circuit configurations in FIGS. 6 to 9 is used, the synchronous rectification efficiency can be improved in light load operation when 3.3 V is output and in normal operation when 24 V is output. Moreover, the power supply can be operated with high efficiency by reducing the switching loss on the primary side.

The current resonance power supply according to the first to the third exemplary embodiments can be applied as a low-voltage power supply for image forming apparatuses, such as laser beam printers, copying machines, and facsimiles. This power supply device can be used to supply power to the controller in those image forming apparatuses, and is also applicable to supply power to the motor to drive the conveyance rollers to convey recording sheets.

Figure 11A:
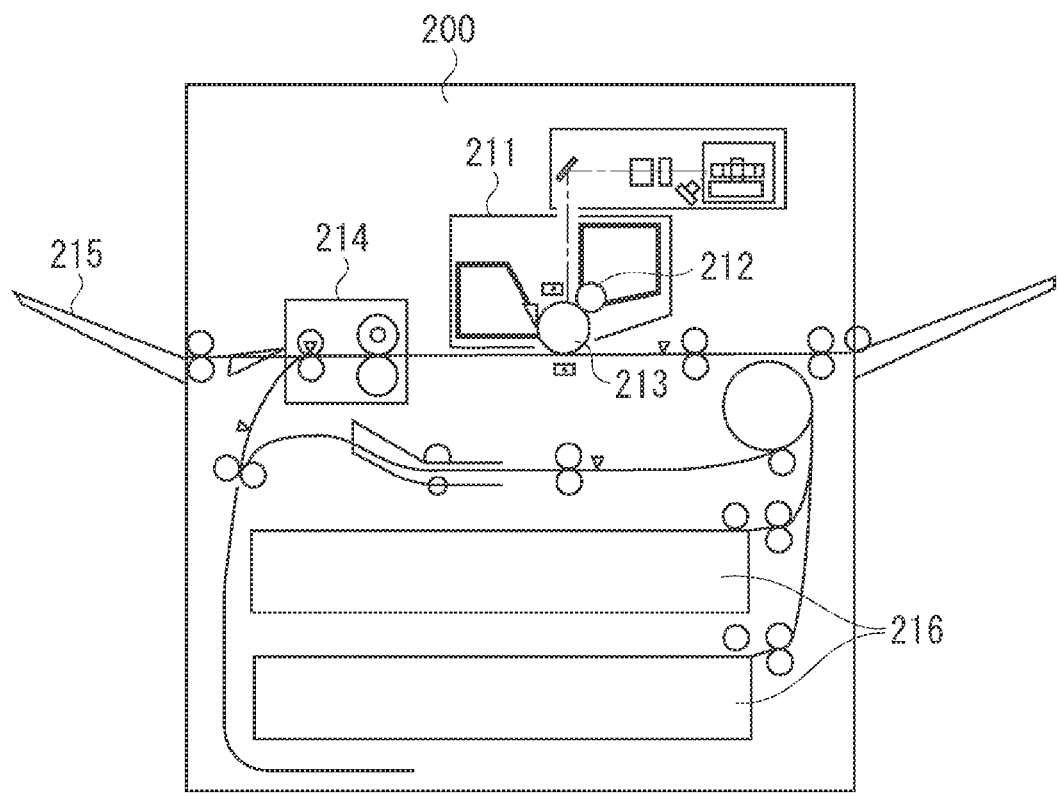
FIG. 11A illustrates a schematic configuration of a laser beam printer according to one embodiment of the invention and FIG. 11B illustrates a power supply line from a power supply to a controller according to one embodiment of the invention.
Figure 11B:
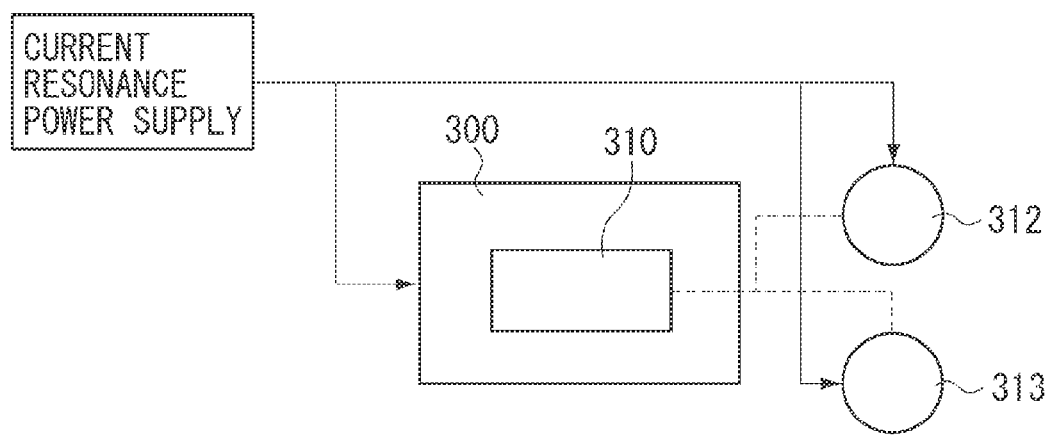

FIG. 11A illustrates a schematic configuration of a laser beam printer as an example of the image forming apparatus. A laser beam printer 200 includes a photosensitive drum 211 as an image bearing member on which a latent image is formed in the image forming block 210, and an image development unit 212 to develop the latent image on the photosensitive drum. A toner image developed on the photosensitive drum 211 is transferred to a sheet (not illustrated) as a recording medium which is supplied from a cassette 216. The toner image transferred to the sheet is fixed by a fixing unit 214, and the sheet is discharged to a tray 215. FIG. 11B illustrates a power supply line from the power supply to a controller 300 of the image forming apparatus. The current resonance power supply can be applied to supply power to a controller in a CPU 310 to control an image forming operation, and also can be used as a low voltage power supply to motors 312, 313 as a drive for an image forming process. 3.3 V is supplied to the controller 300, and 24 V is supplied to the motors. For example, the motor 312 drives the conveyance rollers to convey sheets and the motor 313 drives the fixing unit 214.

The current resonance power supply described above is not limited to use in the image forming apparatus and can be used as a low-voltage power supply for other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288833 filed Dec. 21, 2009 and No. 2010-258188 filed Nov. 18, 2010, which are hereby incorporated by reference herein in their entirety.

What is claimed is:

1. A power supply apparatus comprising:
a switching element connected to a secondary winding of a transformer and configured to switch a voltage generated in the secondary winding of the transformer;
a voltage-to-current conversion unit configured to convert a change of a voltage at a terminal of the switching element on a side of the secondary winding of the transformer and a change of a voltage at a terminal of the switching element on a voltage output side into respective currents;
a current-to-voltage conversion unit configured to convert the respective currents output from the voltage-to-current conversion unit into respective voltages; and
a comparator unit configured to compare the respective voltages output from the current-to-voltage conversion unit,
wherein a switching operation of the switching element is controlled by a signal output from the comparator unit.

2. The power supply apparatus according to claim 1, further comprising a constant voltage unit provided on the voltage output side of the switching element.

3. The power supply apparatus according to claim 1, further comprising a second voltage-to-current conversion unit configured to operate according to an output from the comparator unit and a second current-to-voltage conversion unit configured to convert a current output from the second voltage-to-current conversion unit to a voltage.

4. The power supply apparatus according to claim 1, wherein the power supply apparatus is operable in a normal mode or a standby mode, in which an output voltage is smaller than in the normal mode, and wherein timing for operating the comparator unit is changed or a reference voltage to operate the comparator unit is changed in response to a transition between the normal mode and the standby mode.

5. The power supply apparatus according to claim 1, wherein when a current in a load is larger than a threshold value, timing for operating the comparator unit is changed or a reference voltage to operate the comparator unit is changed.

6. The power supply apparatus according to claim 1, wherein the power supply apparatus is operable in a normal mode and a standby mode, in which an output voltage is smaller than in the normal mode, and wherein the apparatus further comprises a first unit for changing an output voltage in response to a transition between the normal mode and the standby mode, and a second unit for changing timing for operating the comparator unit or changing a reference voltage for operating the comparator unit according to the output voltage.

7. The power supply apparatus according to claim 1, further comprising a rectify unit connected in parallel with the switching element, wherein the rectify element includes a diode parasitic in the switch unit.

8. The power supply apparatus according to claim 1, further comprising a switching element configured to switch a primary side of the transformer, wherein the switching element on the secondary side of the transformer is OFF while the switching element on the primary side of the transformer is ON.

9. An image forming apparatus comprising:
an image forming unit configured to form an image on a recording material;
a control unit configured to control an operation of the image forming unit;
a power supply unit configured to supply a voltage to the control unit,
wherein the power supply unit comprises a voltage-to-current conversion unit configured to convert a change of a voltage at a terminal of the switching element on a side of a secondary winding of a transformer and a change of a voltage at a terminal of the switching element on a voltage output side into respective currents, a current-to-voltage conversion unit configured to convert the respective currents output from the voltage-to-current conversion unit into respective voltages, and a comparator unit configured to compare the respective voltages output from the current-to-voltage conversion unit,
wherein a switching operation of the switching element is controlled by a signal output from the comparator unit.

10. The image forming apparatus according to claim 9, wherein the power supply unit further comprises a constant voltage unit provided on the voltage output side of the switch unit.

11. The image forming apparatus according to claim 9, further comprising a second voltage-to-current conversion unit provided on the output side of the pulse voltage of the switch unit and configured to operate according to an output from the comparator unit and a second current-to-voltage conversion unit configured to convert a current output from the second voltage-to-current conversion unit to a voltage.

12. The image forming apparatus according to claim 9, wherein the power supply device is operable in a normal mode and a standby mode, in which an output voltage is smaller than in the normal mode, and wherein timing for operating the comparator unit is changed or a reference voltage to operate the comparator unit is changed in response to a transition between the normal mode and the standby mode.

13. The image forming apparatus according to claim 9, wherein when a current in a load is larger than a threshold value, timing for operating the comparator unit is changed or a reference voltage to operate the comparator unit is changed.

14. The image forming apparatus according to claim 9, wherein the power supply device is operable in a normal mode and a standby mode, in which an output voltage is smaller than in the normal mode, and wherein the power supply device further comprises a first unit for changing an output voltage in response to a transition between the normal mode and the standby mode, and a second unit for changing timing for operating the comparator unit or changing a reference voltage for operating the comparator unit according to the output voltage.

15. The image forming apparatus according to claim 9, further comprising a rectify unit connected in parallel with the switching element, wherein the rectify unit includes a diode parasitic in the switch unit.

16. The image forming apparatus according to claim 9, further comprising a switching element configured to switch a primary side of the transformer, wherein the switching element on the secondary side of the transformer is OFF while the switching element on the primary side of the transformer is ON.

* * * * *